Jan. 6, 1942.  V. L. RONCI  2,268,670

ELECTRON DISCHARGE DEVICE

Filed Dec. 2, 1939  5 Sheets-Sheet 1

INVENTOR
V. L. RONCI
BY
Walter C. Kiesel
ATTORNEY

INVENTOR
V. L. RONCI
BY Walter C. Kiesel
ATTORNEY

Jan. 6, 1942. V. L. RONCI 2,268,670

ELECTRON DISCHARGE DEVICE

Filed Dec. 2, 1939 5 Sheets-Sheet 3

INVENTOR
V. L. RONCI
BY
Walter C. Kiesel
ATTORNEY

Jan. 6, 1942.  V. L. RONCI  2,268,670
ELECTRON DISCHARGE DEVICE
Filed Dec. 2, 1939  5 Sheets-Sheet 4

INVENTOR
V. L. RONCI
BY Walter C. Kiesel
ATTORNEY

Patented Jan. 6, 1942

2,268,670

UNITED STATES PATENT OFFICE 2,268,670

ELECTRON DISCHARGE DEVICE

Victor L. Ronci, Brooklyn, N. Y., assignor to Bell Telephone Laboratories, Incorporated, New York, N. Y., a corporation of New York Application December 2, 1939, Serial No. 307,221

19 Claims. (Cl. 250—27.5)

This invention relates to electron discharge devices and a method of assembly thereof and more particularly to types of devices for use in ultrahigh frequency transmission systems.

In such devices the electrode spacing must be extremely small to maintain a short transit time for electrons and the supports or terminal conductors of the cooperating electrodes must be spaced sufficiently apart to reduce lead inductance and increase the internal and external leakage resistance paths of the device. The first requirement is, of course, a mechanical expedient readily fulfilled, depending on the current rating of the device desired, and the second requirement may be accomplished in a variety of structures but in order to confine the size of the device commensurate with its intended use, it has been found convenient to support the cooperating electrodes from opposite ends of the enclosing vessel.

Such restrictions raise considerable difficulty in manufacturing technique due to the microscopic spacing of the electrodes and the maintenance of the accurate spacing during the sealing of the vessel. These difficulties are multiplied when it is attempted to increase the number of elements in the device, such as may be contemplated in a multiunit or push-pull amplifier or modulator device.

An object of the invention is to facilitate the assembly of ultra-high frequency discharge devices and particularly multi-unit devices.

Another object of the invention is to hermetically seal the vessel of the device without the use of highly expensive holding jigs.

A further object of the invention is to eliminate the dislocation of the elements and prevent changes in the spacing thereof during the sealing operation.

In accordance with one aspect of this invention, a multi-unit device comprises an enclosing vessel of two substantially similar dish sections of precast or pressed, highly vitreous material having cooperating hollow annular channels in ground joining faces of the sections which form datum and sealing surfaces for the fabrication of the device and a plurality of tubular extensions from opposite dished sections which are parallel to the axis of the device. A pair of grid elements and a pair of filamentary cathodes are supported by short rigid conductors which are sealed in the extensions of one section and a pair of anodes, each having a plurality of conductors which are sealed in the extensions of the opposite section, are aligned to substantially surround the respective cathodes and grid elements of the separate units.

A feature of this assembly resides in the construction of the grid elements in which a continuous helix is supported by an internal bar and external heat radiating fins and a short conductor is connected to the fins at right angles to the axis of the grid elements. This arrangement strengthens the grid structure and facilitates the assembly and mounting of the grid in the vessel.

Another feature of the invention relates to the anode structure and mounting wherein a solid triangular carbon block is recessed to provide a cavity for the reception of the grid and filament and the block is secured to a pair of conductors by wire rods passing through the block. This assembly also includes a heat shield adjacent to the rear of the anode to protect the glass seals from heat strain. This construction facilitates the mounting and alignment of the anodes with respect to the other cooperating electrodes and materially aids in insuring accurate and positive space relationship with respect to the grid elements.

A further feature of the invention relates to the method of sealing the electrodes in the dish-sections of the vessel to insure true alignment of the respective electrodes of the units when the sections are sealed as an evacuated enclosure. This step involves the preliminary mounting of the grid elements and anode structure in a guide member which is provided with cooperating recesses for the grids and convex projections for the anodes on opposite sides, respectively, and parallel annular surfaces which engage the ground datum and sealing surfaces of the dish sections to accurately align the electrodes in their relative positions in the two sections of the vessel so that the electrodes may be secured to the conductors in the dish sections, and, after the removal of the guide member, the dish sections may be reassembled for sealing.

Another feature of the invention relates to the mounting of the filaments by a three-point supporting assembly after the mounting of the grid elements in position. This operation involves mounting arms on the conductors so that the terminations of the arms are brought into line with openings in the grid elements, threading a pair of fine filaments through the grid openings and securing the filaments to the arms under suitable tension so that the filaments are parallel and axially spaced from the turns of the grids.

A further feature of the invention relates to the sealing of the dish sections together without the use of an expensive holding jig which would ordinarily be necessary due to the contour of the external surface of the vessel which is quite variable since the conductor seals complicate the configuration of the outer surface of the vessel and particularly without changing the relative spacing of the grids and anodes.

In accordance with this invention, the completely assembled device is placed in a mount of a sealing machine and the exhaust tubulation is coupled to an evacuating pump to reduce the pressure within the vessel and thereby create an external pressure great enough to rigidly hold the sections together and prevent shifting of the anodes with respect to the grid elements. After the desired vacuum is obtained, the amount is rotated and oppositely disposed flame jets coupled with an inductive high voltage source generate an intense heat to fuse a limited zone of the peripheral joint of the two sections to hermetically seal the vessel. A hard skin may be produced over the sealing area by chilling the seal so that stresses in the internal plastic glass of the seal reduce the tension strain at the periphery of the seal. This permits higher radial temperature gradients in the glass during the sealing operation in order to prevent oxidation of the electrodes. During the sealing operation the vacuum in the vessel is maintained and the annular channel adjacent the sealing surface limits the extent of the fusing of the contact surfaces of the sections so that the contact surfaces within the boundary of the annular channel are not affected by the heating flame. This insures accurate spacing between the anodes and the grids and prevents the collapse of the dish sections by the force of the external pressure. The annular channel is so shaped that the inner surface of the seal is least affected by the external pressure while the glass is in a molten state. Furthermore, the seating surfaces of the dish sections within the boundary of the channel are unaffected during the sealing operation and therefore rigidly maintain the spacial relationship of the electrodes.

These and other features and advantages of this invention will be apparent from the following detailed description taken in conjunction with the accompanying drawings, in which:

Figs. 3 and 4 are perspective and end views, respectively, of the grid element incorporated in the device of this invention;

Fig. 4 shows the anode structure in perspective and the manner of attaching the anode to the supporting conductors;

Figure 1:
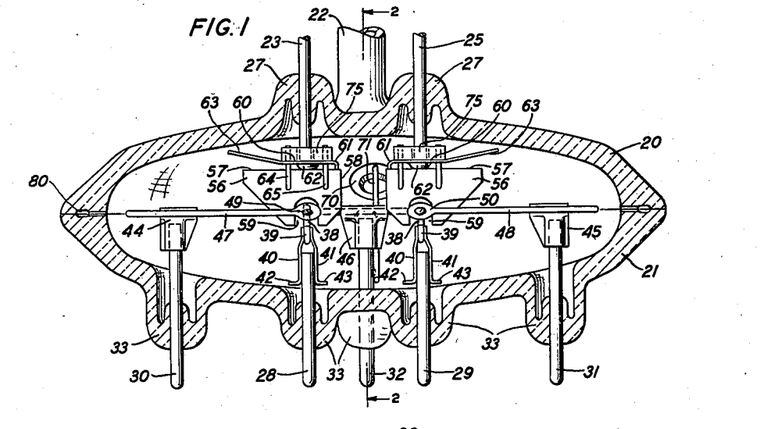
Fig. 1 is a view in cross-section of a completely assembled multiunit discharge device made in accordance with this invention and showing the relative positions of the electrode elements embodied in the device.
Figure 2:
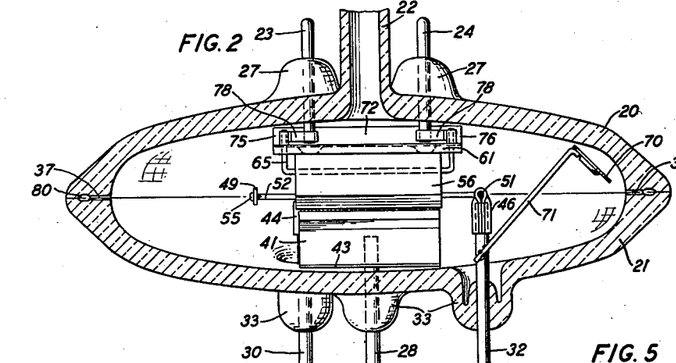
Fig. 2 is another view in cross-section of the device of Fig. 1 looking at the side thereof and showing the relationship of the electrodes to the vertical axis of the vessel.

Referring to the drawings and particularly to Figs. 1 and 2, the electron discharge device according to this invention comprises an evacuated envelope or hollow enclosure consisting of two similar dish sections 20 and 21, made of preformed or precast highly vitreous material, which are sealed together at their abutting surfaces and form an enclosing body or receptacle for the electrode elements of the discharge device. The dish sections may be formed of a low expansion boro-silicate glass, such as "Pyrex" or "Nonex." The section 20 is provided with an axial elongated tubulation 22 and four tubulations (not shown) in which short conductors 23, 24, 25 and 26 are hermetically sealed so that the sealed joints comprise shoulder projections 27, as shown. These conductors are arranged radially from the axis of the section 20 and are spaced in parallel pairs on opposite sides of the tubulation 22. The section 21 is provided with a pair of short tubulations near the axis thereof and three additional tubulations arranged at the corners of a triangle which encompasses the central tubulations and these form sealed joints for other short conductors 28 and 29, 30, 31 and 32, respectively, the seals forming projecting shoulders 33.

The prior sealing of the conductors in the glass section permits thorough cleaning of the internal surfaces of the glass and the conductors to remove oxidation and foreign matter. Each section is also provided with ground rims or plane surfaces composed of an outer sealing surface 34 and an inner seating surface or datum plane 35 with an intermediate annular recess or channel 36 of minimum depth which is interconnected with the inner area of the section, in accordance with one aspect of the invention, by a rectangular orifice 37 arranged at diametrically opposite points to form registering or indexing points for the realignment of the sections and to form a passageway for connecting the channel 36 to the interior of the vessel.

Figure 3:
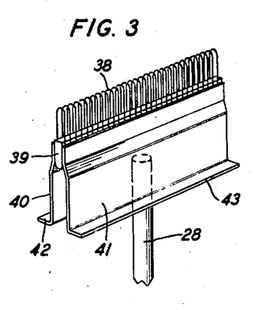

A pair of grid elements are supported within the section 21 by the rigid conductors 28 and 29 which are of tungsten or molybdenum and are hermetically sealed in the dish section. The grid structure, as shown in Fig. 3, comprises a flattened helical wire winding 38 having the turns uniformly spaced by an internal support rod 39 of rectangular form which is provided with one edge conforming to the curved contour of the grid winding and the side surfaces thereof extend into the grid winding substantially one-half the width of the winding. A pair of parallel plates 40 and 41 are attached to the exterior of the grid coincident with the supporting rod 39 to securely fasten the turns of the grid element and form heat radiating shields or fins to dissipate the heat generated in the fine wire turns of the grid and also to reduce primary electron emission from the grid. These plates are bent outwardly beyond the grid winding and then extend parallel to form a recess for the conductor 28 which is welded to the center thereof perpendicular to the length of the plates. The plates are also provided with flange extensions 42 and 43, respectively, to form transverse heat deflecting shields for the glass seals of the conductors 28 and 29.

The conductors 30 and 31 are spaced equilaterally from the grid conductors and in alignment at one end of the grid structures while the conductor 32 is centrally spaced but at the opposite end of the grid structures so that the conductors are located at the corners of a triangle encompassing the grid conductors. This spacing insures adequate insulation paths between the various conductors sealed to the dish section 21 and facilitates the mounting of associate electrodes with the grid elements. These conductors are provided with metallic clips 44, 45 and 46 which embrace the inner extremities of the conductors, and the clips 44 and 45 also embrace transverse looped spring members 47 and 48 which extend toward the grid elements and have eyelet ends 49 and 50, respectively, in alignment with the central longitudinal plane of the grid helix 38. The clip 46 on the conductor 32 embraces the center portion of a transverse support rod 51 having its eyelet ends in alignment with the grid helices and the ends of the springs 47 and 48.

A pair of ribbon filamentary cathodes 52 and 53 extend through the center of the grid windings 38 and are attached at one end to the arm 51 by buttons 54 and are maintained under suitable tension at the opposite ends by being attached to the eyelet terminations 49 and 50 of the spring arms 47 and 48 by similar buttons 55. These filaments may be formed of thoriated tungsten or they may be nickel ribbons coated with alkaline earth oxide, such as barium and strontium, so that when heated to the operating temperature they form an excellent source of electron emission. The ribbon filaments extend longitudinally through the grid helix and the space relationship between the parallel surfaces of the ribbon filament and the turns of the grids is approximately .023 inch. It is evident that the minute spacing between the grids and filaments requires accurate linearity in the mounting of the elements and at the same time it is essential to distribute the supporting connections of the elements to reduce capacitance effects between the respective supports of the associated electrodes.

Figures 4, 5:
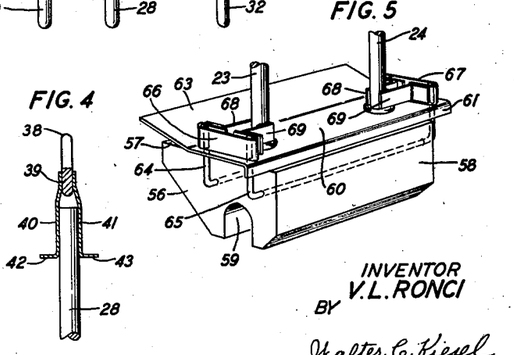

The cooperating anodes for the respective units in the device are supported from the pairs of conductors which extend through the dish section 20, the specific form of the anode construction being shown in Fig. 5. A solid carbon block 56 of suitable length commensurate with the length of the grid structure has a substantially triangular cross-section with the base 57 adjacent to and parallel with the inner surface of the dish section 20 and the perpendicular surface 58 adjacent to and parallel with the axis of the device. The opposite surface of the block, parallel to the base thereof, is provided with a longitudinal recess or deep channel 59 which is arranged in telescopic relation to the grid winding 38 of the grid structure and is accurately spaced therefrom so that the grid turns 38 are parallel to the side surfaces of the recess in the anode.

A rectangular metallic plate 60 extends across the base of the anode 56 and serves as a heat deflecting shield between the high temperature anode and the terminal seals of the anode. The heat shield is spaced from the anode by a longitudinal flange 61 and a pair of central depressions 62 and the opposite edge 63 of the shield is bent upwardly at an angle with respect to the base of the anode. The anode and shield are secured together by a pair of rods 64 and 65 extending through the length of the block and having their ends bent upwardly to pass through apertures in the shield 60. A metal strap 66 embraces the projecting ends of the rods above the shield 60 and is welded thereto and a similar strap 67 embraces the projecting ends of the rods at the opposite end of the block. These straps are provided with angular strips 68 and 69 which extend toward the conductors 23 and 24 and are welded thereto. The parallel spacing of the surfaces of the groove 59 with respect to the helical turns 38 of the grid structure is approximately .0465 inch. With the electrode elements arranged as shown in Fig. 1, the device is hermetically sealed along the peripheral edge in a plane passing through the associated electrodes to maintain a high vacuum within the vessel and during the final evacuation period prior to sealing the tubulation 22 a getter is vaporized to fix the residual gases still remaining in the device. This getter is mounted in a disc member 70 supported by a wire 71 attached to the filament supporting conductor 32.

As previously stated, the vessel is formed of two dish sections 20 and 21 of pressed glass which are joined by a peripheral rim seal to form a receptacle which may be evacuated to obtain the desired functional operation of the multiunit assembly mounted therein. However, the individual spacing of the electrodes and the supports thereof which attain the long external insulation paths between the conductors necessary for ultra-high frequency operation introduces difficulties regarding the accurate relocation of the electrodes of one section with respect to the electrodes of the other section after the conductor seals are completed in the separate sections.

Figure 9:
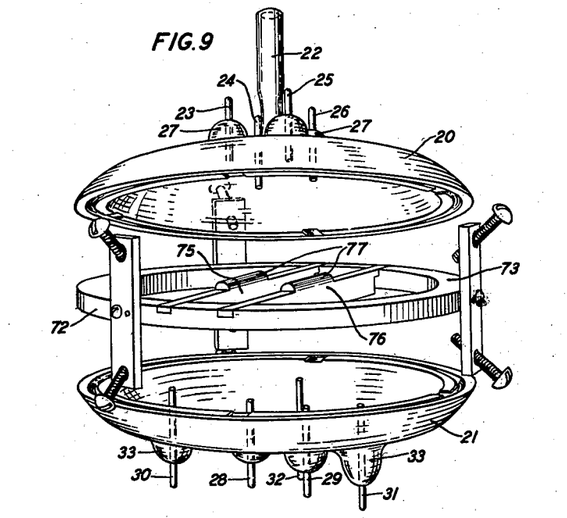
Fig. 9 is a perspective view of the elemental parts of the device of Fig. 1, prior to securing the elements to the vessel section.
Figure 9A:
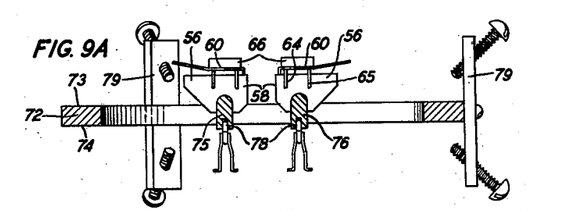
Fig. 9A is a view in cross-section of the guide member with the electrodes in position.
Figure 10:
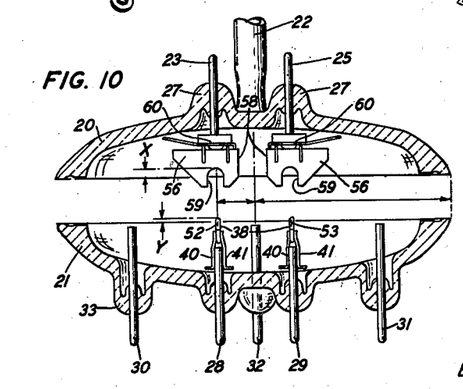
Fig. 10 is a view in cross-section of the open sections of the vessel illustrating the dimensional spacing of the electrodes with respect to the seating surfaces of the vessel.
Figure 11:
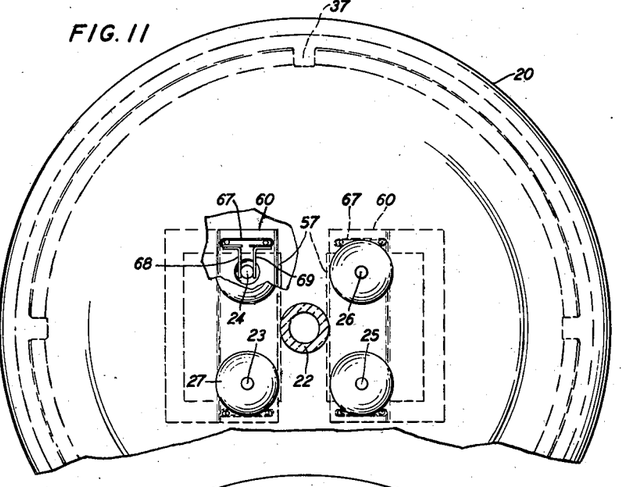
Fig. 11 is an exterior plan view, partly broken away, of the upper section of the vessel shown in Fig. 1 with details of the supporting assembly of one of the anodes illustrated in full line to visualize the relationship of the anode element with respect to the axis of the vessel.

This invention overcomes these difficulties by novel steps in the processing of the assembly in the following manner: An accurately machined circular guide member or ring 72, as shown in Fig. 9A, is provided with parallel surfaces 73 and 74 to match the plane surfaces of the sections 20 and 21 and is also provided with parallel bridging members 75 and 76 which extend across the diameter of the guide member and are accurately spaced from the center and the periphery of the ring. The bridging members are provided with a top surface 77, of arcuate cross-section, which extends beyond the plane of the surface 73 of the ring and is adapted to fit into the recess 59 of the anode. The lower surface of the members 75 and 76 is milled to form parallel longitudinal slots or recesses 78 to receive the grid assemblies shown in Fig. 3 and is in a plane spaced some distance below the plane of the surface 74 of the ring. The dimensions X and Y, shown in Fig. 10, which determine the relation of the sections with respect to the electrodes, are proportionally designed to provide accurate space relation between the grid and anode surfaces when the guide is removed and the sections are joined together to form a complete vessel. These dimensions are held within close limits due to the accurate contact of the ring surfaces with the datum points or planes 35 of the sections. The ring also determines the axial symmetry of the electrodes with respect to the perimenter of the sections.

When the electrode assemblies of the grids and anodes are accurately aligned in the guide member, the glass dish section 21 may be applied first to the guide member 72 with its sealing surface 34 and datum surface 35 engaging the plane surface 73 of the ring. After aligning the anodes with respect to the paired conductors in the section, the periphery of the dish 20 is clamped to the ring by adjustable screws passing through spaced straps 79 on the ring 72.

Figure 12:
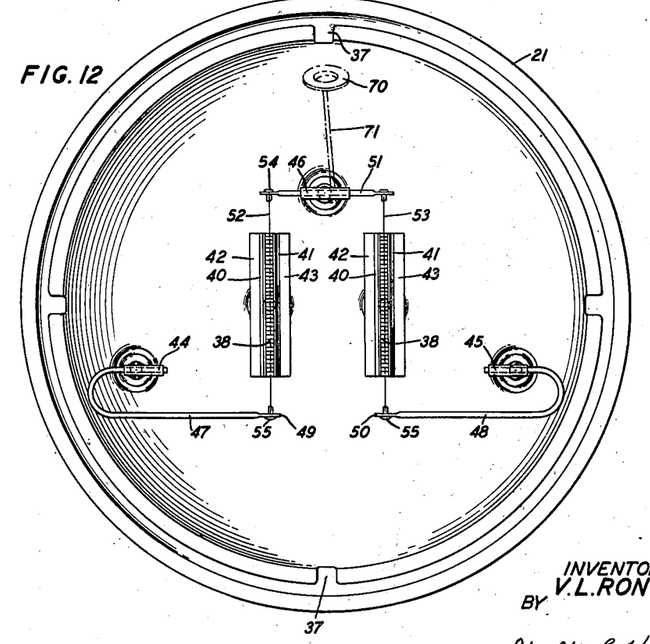
Fig. 12 is an interior plan view of the lower section of the vessel shown in Fig. 1 showing the assembly of the grid elements and the filamentary cathodes.

The straps 68 and 69 on the anode superstructure will be adjacent the respective conductors of each anode and the straps are affixed to the conductors by inserting welding electrodes through the open spaces in the ring to contact the straps and conductors. The dish section 20 is then removed and the section 21 is adjusted in position on the lower surface 74 of the ring so that the conductors 28 and 29 are aligned with the cavity of the fins 40 and 41 of the grid elements. These conductors are secured to the grids in the same manner as described above in connection with the anodes. After these operations are completed the guide member 72 is removed and the filament supporting details are affixed to the three remaining conductors in the dish section 21. The filaments 52 and 53 are then mounted in position, as shown in Fig. 12. The section 20 with the anodes mounted therein is then brought into contact with the section 21, with their ground surfaces in abutting relation and the indexing recesses 37 in both sections in symmetrical alignment so that the anodes 58 are in telescopic relation with respect to the grids 38 whereby the accurate spacing required between these elements is automatically attained, due to the prior accurate relationship between the electrodes, the dish sections and the guiding member 72. When the adjustment is completed, the sections are temporarily held together by draftsman's tape attached to the sections at distributed points over the peripheral edges at right angles to the rims thereof. In this relation the two sections of the vessel form an oval channel 80 intermediate the inner and outer edges of the rim and the channel is in communication with the interior of the vessel through the indexing recesses 37 as shown in Fig. 2.

The exterior contour of the vessel is very irregular due to the shoulder seals around the conductors and it is practically impossible to produce a holding jig for the two sections for performing the sealing of the vessel in a rotary sealing machine. This is due to the variable shape of the shoulder seals of the conductors, which are slightly different in individual devices. If an attempt is made to mount the sections in a holder accurately proportioned for one device the holder would be useless for another device of the same construction since the differences in shoulder contours would be sufficient to throw the sections out of alignment and thereby alter the spacing of the electrodes in the device.

Figure 13:
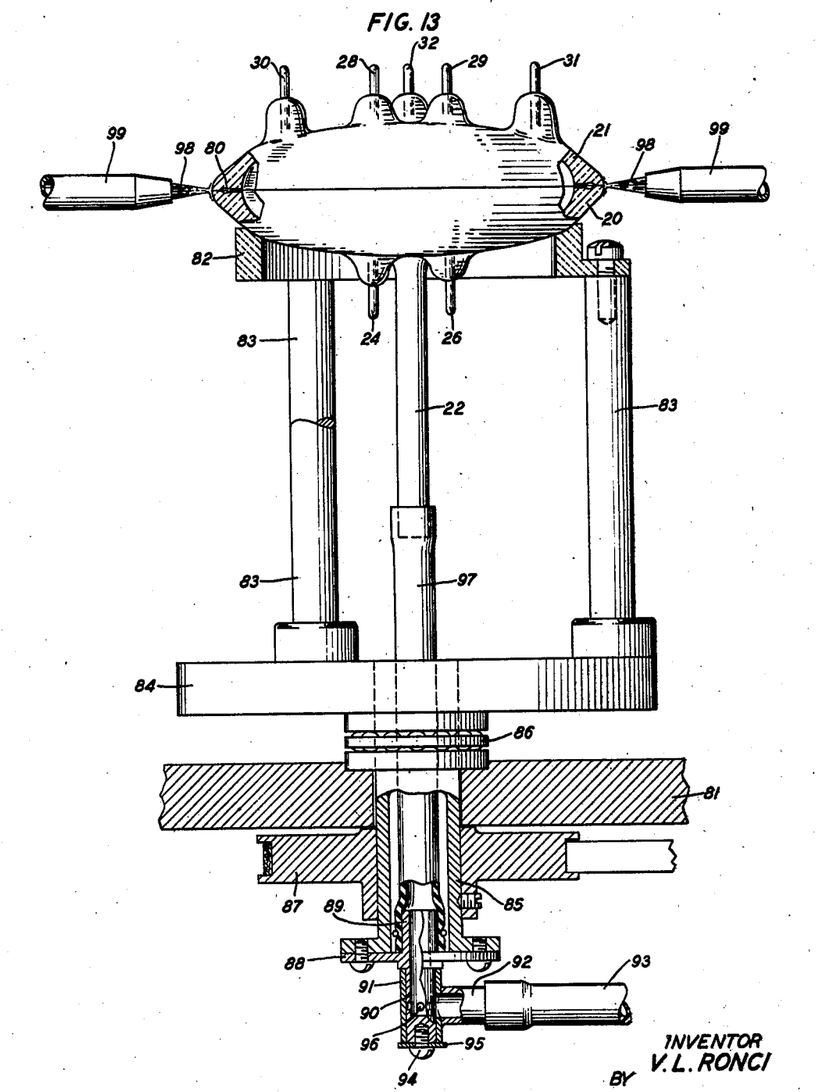
Fig. 13 illustrates the method of sealing the sections of the vessel in accordance with this invention, parts of the machine head being shown in section to clearly show details of construction.
Figure 14:
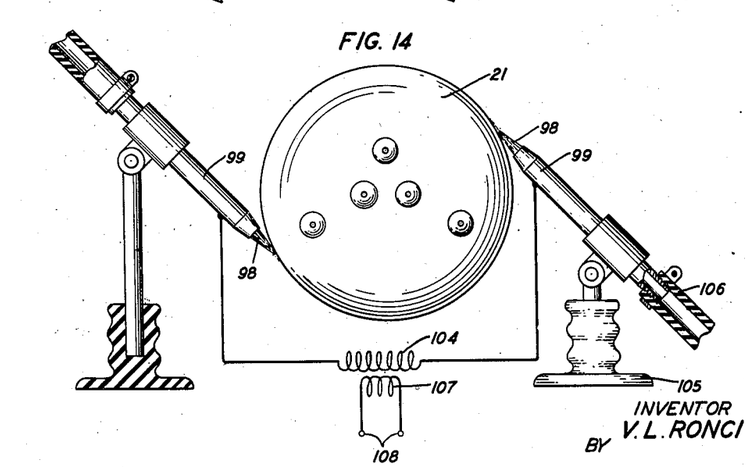
Fig. 14 is an arrangement, partly diagrammatic, for coupling a high voltage heating source to the burners for producing an intense heating zone during the sealing operation.

This difficulty is overcome in accordance with this invention by an arrangement as shown in Fig. 13 in which the sections of the vessel are held in a rotary head of a sealing machine without the aid of expensive holding jigs and in which external pressure is relied upon to maintain the sections in accurate alignment during the fusing of the peripheral seal of the device. Referring to Fig. 13, the sealing operations are performed on a rotary sealing machine in which a stationary base 81 carries a rotatable head comprising an insulating ring seat 82, of ceramic material, supported by post 83 connected to a disc 84 which is mounted upon a hollow spindle 85 extending through the base 81. A roller bearing 86 spaces the head from the top of the base while a flanged pulley 87 is fastened to the spindle below the base. The lower end of the spindle 85 is closed by a flanged nipple 88 having a throat 89 extending within the spindle and a closed sleeve termination or cup extension 90 extending beyond the flange of the nipple. A stationary sleeve 91 surrounds the cup extension of the nipple and is provided with an elbow outlet 92 which is connected to a pump conduit 93, the sleeve 91 being held in position on the nipple by a screw 94 and washer 95, which rotate with the nipple and the spindle. The internal cup 90 is provided with a plurality of openings 96 in the path of the elbow outlet 92. The surfaces between the extending cup 90 of the spindle and the stationary sleeve 91 are sealed by grease to prevent leakage between the movable and stationary elements of the connection. The internal sleeve 89 of the rotatable nipple carries a flexible tubing 97, preferably of rubber, which frictionally engages the central tubulation 22 of the dish section 20 of the vessel, which is mounted in inverted position on the ring seat of the head of the machine.

The sealing process is started by evacuating the air from the device mounted on the head through the exhaust connection 93 connected to the pump, while the head is held in a stationary position. When a sufficient vacuum is obtained in the device, the external pressure due to the difference in pressures within and outside of the vessel forces the ground surfaces 34 and 35 together to form a practically sealed joint so that the sections cannot be displaced from their relative positions. At this point the temporary tape binding is removed from the sections. During the evacuation of the vessel, air is also removed from the annular channel 80 so that an insulating barrier is formed between the sealing surfaces 34 and the seating surfaces 35 of the dish sections. The head is now rotated while continuing the evacuation of the vessel and a pair of oppositely disposed pin-point flames 98 from burners 99 are directed toward the peripheral contact rim of the sections to fuse the adjacent portions uniformly on the peripheral edge of the vessel.

Figure 6:
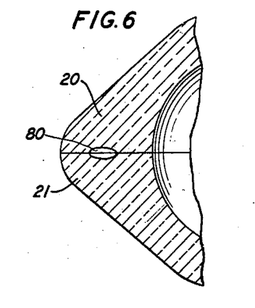
Fig. 6 is an enlarged view in cross-section of a portion of the vessel of the device of Fig. 1 showing the seating and sealing abutting surfaces and an intermediate annular channel.
Figure 6A:
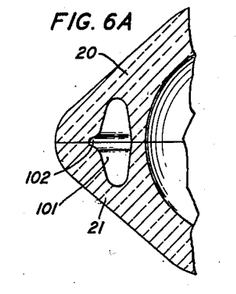
Fig. 6A is an enlarged view in cross-section of a portion of the vessel showing a modification of the annular channel in the sections.
Figure 6B:
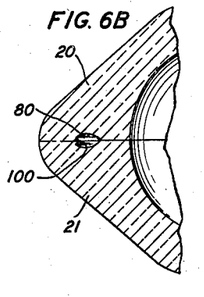
Fig. 6B represents in enlarged cross-section the final configuration of the channel and sealing area of the dish sections as shown in Fig. 6.

Upon fusing of the glass adjacent the sealing surfaces 34 of the sections, the external pressure together with the vacuous condition of the annular channel 80 causes a slight sucking-in of the sealing surfaces, as shown in Fig. 6B, to produce a homogeneous and hermetically tight seal along the whole area of the sealing surfaces. However, during the sealing operation, the vacuous channel 80 forms an insulating barrier between the hot sealing zone and the contacting seating surfaces 35 of the sections. The seating surfaces therefore prevent the external pressure from causing the collapse of the two sections due to the difference in pressures on the interior and exterior of the device and thereby maintain the electrodes in normal position so that the minute spacings therebetween in the opposite sections are unaltered from the predetermined accurate spacing desired between the elements. The seal produced between the sealing surfaces 34 of the sections eliminates subsequent damage to the device by cracks or leakage which would impair the usefulness of the device. Such a seal is realized partly by the stability of the seating surfaces 35 of the sections and also the vacuous condition of the annular channel 80 between the sealing and the seating surfaces. After the seal is completed the head is stopped and the evacuation discontinued so that the completed device may be temporarily sealed off and removed from the head of the machine.

When it is desired to maintain a pressure medium in the annular channel 80 between the glass dish sections less than atmospheric but not as low as the internal pressure in the vessel, the recesses 37 may be omitted. Then the seating surfaces 35 of the sections form a resistance path so that slight evacuation of the channel may be accomplished. This produces three stages of pressure conditions during the sealing operation, namely, the external pressure which is at atmosphere, a pressure less than atmosphere in the annular channel, and a substantial vacuum condition within the vessel. Under these conditions, the compression strain on the seating surfaces 35 of the sections is relieved and the radial and torsional strains developed by the sucking-in at the sealing area is compensated. Furthermore, the contour of the channel wall 100, as shown in Fig. 6B, eliminates any sharp gradient in the seal so that an abrupt joint is accomplished.

Fig. 6A shows a modification of the channel area between the glass sections so that a zone of reduced cross-section adjacent the nodal portion of the channel permits flexing of the heated glass and reduces strain gradients in the sealing zone adjacent the periphery of the dish sections. In this arrangement the lesser communicating annular recess 102 in the outer edges of the channel adjacent the sealing surfaces 34 of the section forms a relieving cavity for the plastic glass during the fusing of the seal.

Figure 6C:
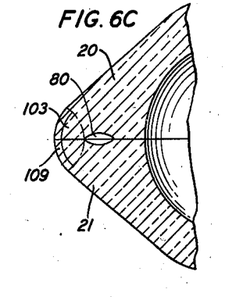
Fig. 6C is an enlarged cross-section of the juxtaposed dish sections and illustrates various zones defined in the production of the seal of this invention.
Figure 7:
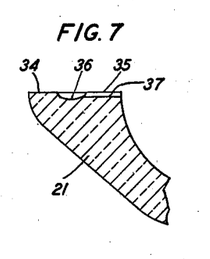
Fig. 7 illustrates a plan view of a portion of either section of the enclosing vessel to show a connecting depression provided between the annular channel and the inner area of the vessel.
Figure 8:
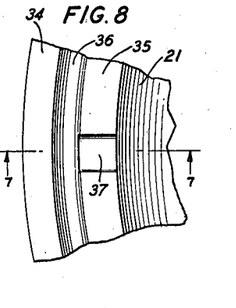
Fig. 8 is a view in cross-section of the portion of the vessel shown in Fig. 7.

Referring to Fig. 6C, the sealing zone 103 is limited to an area which terminates at the juncture of the sealing surfaces 34 and the channel 80 and in order to attain a rapid heating of this area it has been found desirable to supplement the usual heating by gas burners with a high voltage radio frequency source of heating to insure an intense and quick high temperature heat for the sealing operation. This is accomplished by connecting a secondary winding 104 of a transformer to the burners 99 which are insulated from ground by a supporting insulator 105 and the rubber tubing 106 of the burner supply. A primary winding 107 is connected to a suitable source of voltage of radio frequency by terminals 108. The large inductance of the secondary winding 104 produces a high voltage between 5 to 20 kilovolts.

As the glass periphery of the sections is gradually heated to a dull red by the burner flames the high temperature of the glass reduces its resistance so that it becomes conducting and the high voltage coupled to the burners intensifies the heating of the affected zone very quickly to render the glass plastic. In order to control the pliant glass and permit the setting glass of the seal to be annealed it has been found advantageous to chill the outer wall of the plastic seal by any suitable means, such as a blast of air, to form a hard skin 109 over the exterior of the seal. This operation permits the inner plastic glass to set normally and thereby avoid tension stresses being developed which would require long subsequent annealing treatment.

While the invention has been described, in a specific sense, with respect to a multiunit ultrahigh frequency discharge device, it is of course understood that various modifications may be made in the number, size and type of electrodes mounted in the dish sections of the vessel and such changes are deemed to be within the scope of this invention as defined in the appended claims.

What is claimed is:

1. In the manufacture of an electron discharge device involving a vessel of precast dish sections, and cooperating electrodes supported from said sections, the process of assembly which comprises sealing electrodes in the dish sections so their extremities extend beyond the planes of the rim surfaces of said sections, said surfaces having a sealing portion and an inner seating portion with an annular channel therebetween, placing the sections together with the sealing and seating portions and annular channel in cooperating and abutting relation, exerting external pressure on said sections, and fusing said sealing portion of said vessel to form a hermetic seal without affecting the seating portion, whereby said cooperating electrodes are prevented from changing in space relation.

2. In the manufacture of an electron discharge device involving a vessel of precast dish sections, and cooperating electrodes supported from said sections, the process of assembly which comprises sealing electrodes in the dish sections so their extremities extend beyond the planes of the rim surfaces of said sections, said surfaces having a sealing portion and an inner seating portion with an annular channel therebetween, placing the sections together with the sealing and seating portions and annular channels in cooperating and abutting relation, evacuating said vessel, heating the periphery of the sealing portion to a fusing temperature, and shielding said seating portion from the effects of fusion to thereby insure the accurate space relation of said electrodes.

3. In the manufacture of an electron discharge device involving a vessel of precast dish sections, and cooperating electrodes supported from said sections, the process of assembly which comprises sealing electrodes in the dish sections so their extremities extend beyond the planes of the rim surfaces of said sections, said surfaces having a sealing portion and an inner seating portion with an annular channel therebetween, placing the sections together with the sealing and seating portions and annular channel in cooperating and abutting relation, reducing the pressure in said vessel whereby the external pressure maintains said sections in conjoint relation, rotating said vessel in the path of heating burners to fuse the sealing portions thereof, and preventing the fusing action from reaching said seating portion of said vessel.

4. In the manufacture of an electron discharge device involving a vessel of precast dish sections, and cooperating electrodes supported from said sections, the process of assembly which comprises placing the electrodes on a guide member, inserting the guide member adjacent one section, placing the other section over said guide member, affixing said electrodes to said sections, removing the guide member, adjusting said sections together to determine the final space relation of said electrodes, temporarily fastening said sections in adjusted position wherein the abutting surfaces thereof form a circular plane having a sealing portion and a seating portion in coaxial relation and separated by an annular cavity formed in both sections, evacuating said vessel and cavity, heating the periphery of said vessel in the plane of said abutting surfaces to render the sealing portion plastic and deformable to produce an hermetic sealed joint, and preventing the collapse of said sections by the protecting vacuous cavity and seating surfaces of said vessel.

5. In the manufacture of an electron discharge device involving a vessel of precast dish sections and cooperating electrodes supported from said sections, the method which comprises forming an annular channel centrally in the plane surface of each dish section, grinding each surface to a polish finish, mounting the electrodes on opposite sides of a guide member, placing said guide member between said sections, affixing said electrodes to conductors in said sections, separating said sections with the electrodes in position, removing the guide member, replacing said sections with the plane surfaces in abutting relation and the electrodes in telescopic relation, evacuating said annular channel to form a transient hermetic seal and to resist axial and transverse dislocation of said sections from the adjusted relation with respect to the collateral spacing of said electrodes, and fusing the abutting edges of said sections to form a permanent hermetic seal over the area of the peripheral plane surfaces terminated by said annular channel while preventing collapse of said sections by the surfaces between said channel and the interior of said vessel.

6. The method of fabricating an electron discharge device which comprises sealing electrodes into similar preformed half sections of a vessel, adjusting said half sections together to align said electrodes, evacuating said vessel, rotating said evacuated vessel in a fusing flame arranged radially with respect to the contacting surfaces of the joint of said sections, and sealing said joint during the rotation and evacuation of said vessel.

7. The method of assembling an electron discharge device having an envelope of two sections providing with peripheral compound seating surfaces and separate electrode elements mounted from each of said sections, which comprises the step of mounting an electrode in each open section in relation to said seating surfaces, superimposing one section on the other to form an envelope and to align the electrodes in cooperating relationship, evacuating the envelope, fusing the outermost seating surfaces together while preventing the fusing of the innermost seating surfaces, and cooling the peripheral surface to form a hard protective skin over the plastic inner area, whereby stress conditions are avoided within said area.

8. An electron discharge device comprising a plurality of electrodes, an enclosure therefor comprising a pair of dish sections assembled and in contact with each other at their rims, said electrodes being supported paraxially by said sections, said rims having a sealing zone in which the rims are united by fusion and a registering zone in which the said rims seat together but are not united, one of said electrodes in one section being in telescopic relation to an electrode in the other section with their cooperating axes being in a plane coincident with the plane of said rims.

9. An electron discharge device comprising an enclosing vessel having two similar precast vitreous sections forming a substantially oval receptacle, a plurality of electrodes within said vessel, means for supporting one of said electrodes from one section and means for supporting other electrodes from the other section, means on said sections forming an hermetically sealed joint, and means adjacent said joint for preventing the alteration of the space relationship of the electrodes during the sealing operation.

10. An ultra-high frequency discharge device comprising an enclosing vessel of two similar sections in a radial plane, a plurality of parallel grid elements sealed through one section, a pair of filamentary cathodes extending through said grid elements and supported in insulating relation in said section, a pair of anodes having longitudinal channel portions sealed to said other section, said channel portions extending around said grid elements and cathodes, and means extending across the area of and interposed between said anodes and the seals thereof to deflect heat radiation from the seals.

11. In an ultra-high frequency discharge device, a grid element comprising turns of a helical wire secured to an internal rod, a pair of flanged heat radiating plates exteriorly secured to said rod and said turns of wire and extending away from said turns, and a central support between said plates and extending at right angles to said grid rod.

12. In an ultra-high frequency discharge device, an anode comprising an elongated carbon mass of substantially triangular cross-section having a longitudinal recess formed in its face parallel to the base of said mass, a pair of rods extending through said mass having ends bent beyond the edge of the base, a pair of supports adjacent the base of said mass and extending perpendicular to said base, a heat shield between said supports and said mass, and means connecting said bent rod ends and said shield to said conductors.

13. The method of fabricating an electron discharge device which comprises fitting a pair of grid assemblies into recesses in a guide member, also fitting a pair of anode assemblies over projections on said guide member in alignment with said recesses, seating said guide member between opposed similar dish sections of pressed glass having datum points contacting the surfaces of said guide member, connecting said grid and anode assemblies to conductors in said sections, removing said guide member, inserting a pair of filaments through said grid assemblies, connecting said filaments to other conductors in one of said sections, adjusting said dish sections together to align said anode assemblies with said grid assemblies in overlapping relation and to space them with respect to said datum points, evacuating said vessel, sealing the edges of said dish sections, and preventing the collapse of said sections during the sealing operation.

14. An electron discharge device comprising a pair of similar dish sections in opposed relation to form a hollow enclosure having a sealed rim in a central plane, a pair of conductors sealed in one section parallel to the axis of said enclosure, separate grid elements mounted on said conductors perpendicular to said axis and extending beyond the plane of said sealed rims, a plurality of conductors sealed in said other section in the same direction as said first conductors, separate anode elements mounted on said last-mentioned conductors within said enclosure in telescopic relation to said grids, a pair of filamentary cathodes extending through said grid elements, means supporting said cathodes in relation to said grid elements, and means on said sealed rims of said sections separate from the seal for maintaining alignment of said elements to insure accurate space relationship.

15. An electron discharge device comprising a hollow vessel of two concave sections in contact with each other at their rims, a plurality of spaced terminal conductors sealed through the walls of said sections parallel to the axis thereof, and electrodes attached to said conductors having their axes perpendicular to the axis of said vessel and aligned in telescopic relation from said two sections, said rims having a sealing surface and a seating surface separated by an annular channel interconnected with the interior of said vessel.

16. An electron discharge device comprising a hollow vessel of two concave sections in contact with each other at their rims, a plurality of spaced terminal conductors sealed through the walls of said sections parallel to the axis thereof, electrodes attached to said conductors having their axes perpendicular to the axis of said vessel and aligned in telescopic relation from said two sections, said rims having a sealing surface and a seating surface separated by an annular channel, and recesses in said seating surface joining said channel to the interior of said vessel and serving as index points in the alignment of said sections.

17. The method of assembling an electron discharge device having a vessel of two sections provided with peripheral compound seating surfaces and separate electrode elements mounted from each section in telescopic relation, which comprises mounting said electrodes in said sections, superimposing one section on the other to align the electrodes and form an enclosing vessel therefor, evacuating the vessel, rotating the vessel, flame heating the outermost seating surfaces to form a partially fused joint, and simultaneously applying a high frequency heating current to said partially fused joint to intensify the fusion of said seating surfaces.

18. The method of assembling an electron discharge device having a vessel of two sections provided with peripheral compound seating surfaces and separate electrode elements mounted from each section in telescopic relation, which comprises mounting said electrodes in said sections, superimposing one section on the other to align the electrodes and form an enclosing vessel therefor, evacuating the vessel, rotating the vessel, flame heating the outermost seating surfaces to form a partially fused point, simultaneously applying a high frequency heating current to said partially fused joint to intensify the fusion of said seating surfaces, and force cooling said joint to chill the plastic seal by the formation of a hard skin exterior, whereby internal tension stresses are avoided without subsequent annealing of the seal.

19. The method of assembling an electron discharge device having a vessel of two sections provided with peripheral compound seating surfaces and separate electrode elements mounted from each section in telescopic relation, which comprises mounting said electrodes in said sections, superimposing one section on the other to align the electrodes and form an enclosing vessel therefor, evacuating the vessel prior to sealing said surfaces, rotating the vessel during subsequent evacuation and sealing, heating the outermost seating surfaces to form a partially fused joint, and force cooling said joint to chill the plastic seal by the formation of a hard skin exterior whereby internal tension stresses are avoided without subsequent annealing of the seal.

VICTOR L. RONCI.